July 24, 1934. W. CATHCART 1,967,288
FRICTION JOINT
Original Filed June 19, 1928  2 Sheets-Sheet 1

Inventor
William Cathcart,
By his Attorneys
Redding, Greeley, O'Shea & Campbell

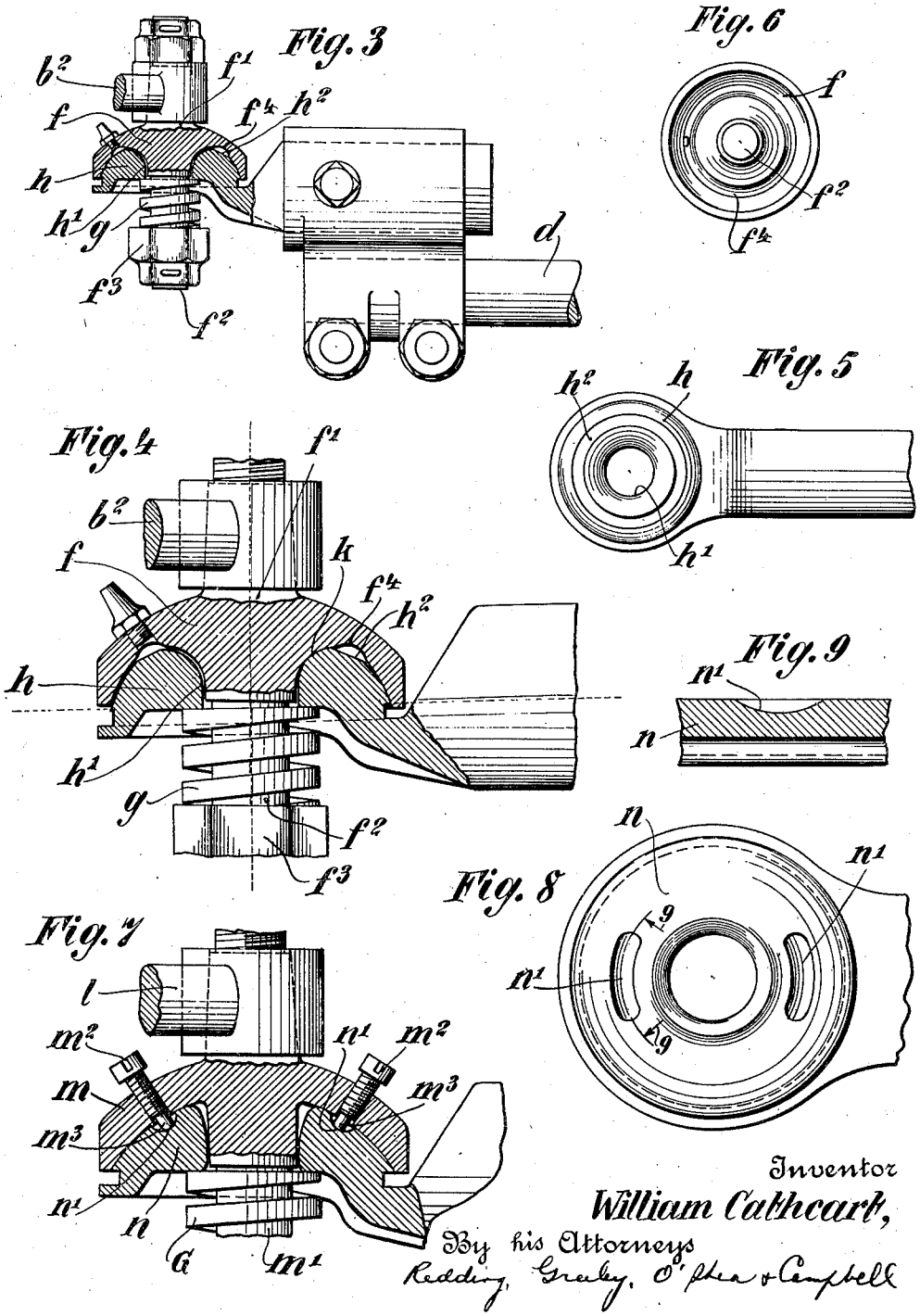

Patented July 24, 1934

1,967,288

UNITED STATES PATENT OFFICE 1,967,288

FRICTION JOINT

William Cathcart, Elizabeth, N. J.

Application June 19, 1928, Serial No. 286,659
Renewed April 4, 1933

10 Claims. (Cl. 280—95)

This invention relates to friction joints suitable for use in connecting associated members through which an operating force is to be transmitted. More particularly, the invention is concerned with a type of friction joint in which the amount of friction offered to relative movement between associated members is progressively reduced upon such movement. The invention is designed primarily with reference to its incorporation in a joint between the tie-rod and steering arms of an automobile in which it is desirable to resist relative movement between the parts when the steering wheels are in their normal or "straight ahead" position and to relieve such friction when the wheels are turned intentionally a predetermined extent to change direction. Steering wheels of an automobile have a tendency to oscillate on their pivots during travel of a car and such oscillations are objectionable. To resist them it is proposed in accordance with the invention to connect the steering arms with the tie-rod through friction joints which resist such oscillations yieldingly under normal conditions. The improved joints, however, are of such a nature that when the driver intentionally deflects the wheels to the right or left to change direction the maximum friction is relieved appreciably so as to facilitate steering, the maximum relief, in the preferred embodiment, being afforded when the wheels are in their extreme angular position. Another characteristic of the invention is that the improved joint is so constructed that when the driver intentionally restores the wheels towards their normal or "straight ahead" position such turning is somewhat assisted rather than hindered.

In the embodiments of the invention illustrated in the accompanying drawings the joints are shown in connection with two types of steering wheel mountings, such embodiments illustrating more generally the adaptability of the invention to different types of operating linkage. In one instance the pivot pins on which the wheels are mounted are reversely inclined and in the other instance the pivot pins are vertical. Where the pivot pins are reversely inclined it follows that the ends of the steering arms when the wheels are turned move in a path which is at an angle to the horizontal, the result being that the end of one arm on one wheel is relatively depressed while the end of the arm on the other wheel is relatively elevated throwing the tie-rod at an angle to the horizontal. Advantage is taken of this resulting inclination of the tie-rod to displace the members of the improved joint in such wise as to reduce the friction therebetween thereby making steering easier as the wheels are swung angularly.

The invention will be described in greater detail in connection with the illustrated embodiments in the drawings, in which:

Figure 3 is a detailed view partly in section and partly in elevation showing the normal position of the improved joint as associated with a steering arm and tie-rod.

Figure 4 is a view on a somewhat larger scale partly in section and partly in elevation showing the joint illustrated in Figure 3 when the wheels are turned out of their normal position thereby inclining the tie-rod to the horizontal.

Figure 5 is a view in plan of one member of the improved joint shown in Figures 3 and 4, which may be the portion carried with the tie-rod.

Figure 6 is a view of the complementary concave member of the joint shown in Figures 3 and 4.

Figure 7 is a sectional view showing another form of the joint.

Figure 8 is a fragmentary detailed view looking down on top of the convex member of the joint shown in Figure 7.

Figure 9 is a fragmentary sectional view taken on the plane indicated by the line 9—9 of Figure 8 and looking in the direction of the arrows.

Figure 1:
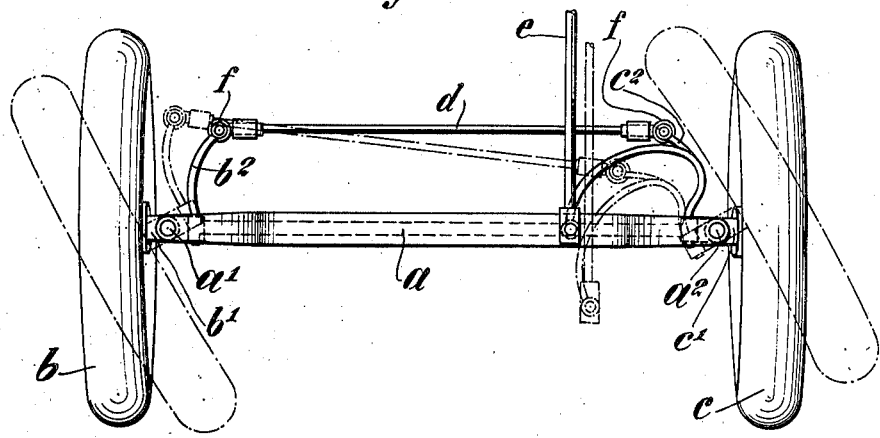
Figure 1 is a view in plan illustrating somewhat diagrammatically an axle and two steering wheels pivotally mounted thereon and showing so much of the steering mechanism as is necessary for an understanding of the invention, the wheels being shown in normal or "straight ahead" position and, in dotted lines, in angular positions.
Figure 2:
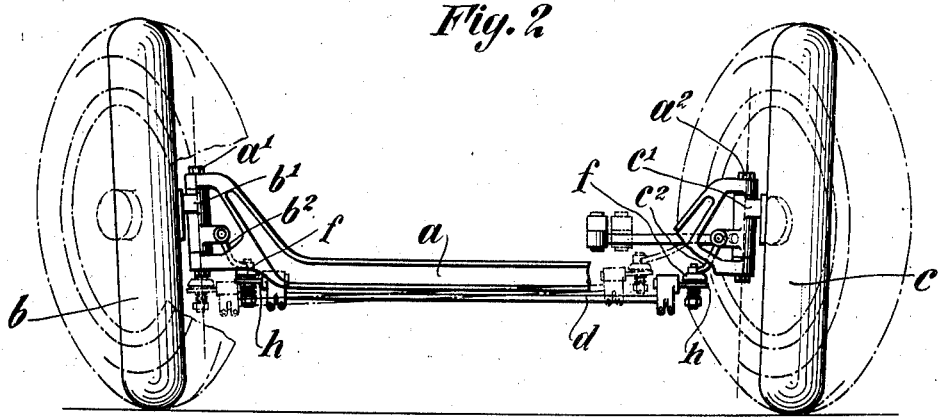
Figure 2 is a view in front elevation of the elements shown in Figure 1, a part of the axle being broken away and the reverse inclination of the pivot pins for the steering wheels being indicated clearly.

A detailed description of the preferred embodiment of the invention will first be given by way of example in order that the principle involved may be understood. As shown in Figure 2 the axle $a$ of a motor vehicle has mounted thereon steering wheels $b$, $c$, by means of pivot pins $a'$, $a^2$, respectively, which pins are reversely inclined as indicated by the dotted lines passing through their axes. The knuckles $b'$, $c'$, are mounted on these inclined pins $a'$, $a^2$, respectively, and carry rearwardly extending steering arms $b^2$, $c^2$, respectively, the ends of which are connected by a tie-rod $d$ all in accordance with present day practice. When steering effort is applied to the interconnected parts described by the operator as through the drag link $e$ the wheels are swung angularly for changing direction. By reason of the inclination of the steering pin $a^2$ when the arm $c^2$ is moved to the left as viewed in Figures 1 and 2 (thereby swinging the wheel $c$ towards the position indicated in dotted lines) the end of this arm will move in a plane inclined to the horizontal and be relatively elevated, as indicated in dotted lines in Figure 2. By reason of the reverse inclination of the steering pins $a'$ the other arm $b^2$ will simultaneously move in a plane which is inclined to the horizontal and be relatively depressed as indicated in dotted lines in Figure 2. The result is that the tie-rod will take an angular position to the horizontal as is indicated in dotted lines in Figure 2.

Referring now to Figures 3–6 the improved friction joint interposed between the ends of the respective arms $b^2$, $c^2$, and the tie-rod $d$ will be described. These figures show the association of the joint with the steering arm $b^2$. The joint comprises generally a concave member $f$ having an upwardly extending spindle $f'$ secured to the end of the arm $b^2$ and a downwardly extending spindle $f^2$ on which is mounted a spring $g$ for a purpose which will be described. The other member $h$ of the joint is of generally convex form adapted to nest within the concave portion of the other member $f$. The lower end of the spindle $f^2$ as secured thereon a nut $f^3$ on which the spring $g$ seats. The other end of the spring $g$ seats on the proximate side of the convex member $h$ thereby urging this member normally into frictional engagement with the concave member $f$. The spindle $f^2$ extends loosely through a central opening $h'$ within the circular convex member $h$. The concave member $f$ is also preferably of circular form as appears clearly from Figure 6. The inner surface of the concave member $f$ may be interrupted circumferentially as indicated at $f^4$ and, similarly, the surface of the convex member $h$ opposite this interruption may likewise be interrupted as shown at $h^2$ so that substantial clearance is provided at this section for relative displacement between the members. In Figure 4 the parts are shown relatively displaced which occurs as described above when the tie-rod $d$ takes an angular position to the horizontal, Figure 4 showing the left-hand end of the tie-rod relatively depressed. In this position the convex member $h$ is tilted laterally within the concave member $f$ bringing a portion of the surface of the convex member adjacent to the opening $h'$ into engagement with the surface of the concave member as indicated in Figure 4 at $k$. Simultaneously, a portion of the convex member adjacent to the circumferential groove $f^4$ has moved out of engagement with the concave member. The condition just described applies only to those portions of the joint to the right of the spindle $f^2$ as viewed in Figure 4. Other portions of the surfaces of the two members have been forced out of engagement with one another more or less completely as shown at the left-hand side of Figure 4.

When the surfaces of the connecting member are normally in engagement, the pressure of the spring $g$ upon the friction surfaces is exerted through a radius which is substantially the greatest radius of the curved surfaces of the friction members. In other words, the spring pressure is exerted upon the members and the force thereof transmitted between the friction surfaces substantially adjacent the outer edge of the friction surfaces. When the members are turned, the contact between the friction surfaces is shifted inwardly toward the axis of the joint. This causes the spring pressure to be exerted between the surfaces at a smaller radius than the normal radius and, as a result, the resistance of the joint to turning decreases substantially by reason of the shorter lever arm through which the opposing force acts.

Whether the shifting of this radius which represents the lever arm through which the opposing force of the spring works is brought about by a construction, such as shown in Figure 4 or one as shown in Figure 7, is of little consequence in so far as the result obtained is concerned in as much as in each case, the cooperating friction members are so formed as to cause a shortening of the lever arm upon a predetermined turning of one of the members with respect to the other. In the construction shown in Figure 4, the action is dependent upon the fact that there is a change in the angular position of the tie rod. The actual amount of friction provided initially may depend on the adjustment of the tension of the spring $g$ through the nut $f^3$. It will be seen that with the surfaces of the two members relatively displaced unbalanced forces tending to restore them to normal relation are constantly present, these forces tending to assist the return of the steering wheels from an angular position to a "straight ahead" position rather than to oppose such effort. This is highly desirable in a steering gear as will be understood. Oscillations of the wheels during normal driving are effectively and yieldingly resisted by the improved joints which offer maximum friction at this time. When the driver deflects the wheels from their normal "straight ahead" position in order to change direction, the parts will immediately be displaced to reduce the resistance offered to this steering effort. The greater the deflection the greater the reduction in resistance thus offered.

In the modification shown in Figure 7 it is assumed that such a joint is connected with a steering arm $l$ which is carried with the wheel mounted on a truly vertical pivot so that when the wheel is swung the arm swings in a truly horizontal plane. In this case what may be conveniently termed the upper member $m$ of the joint is secured to said arm $l$ and has a downwardly extending spindle $m'$. The co-operating lower member $n$ may be of convex form and circular in outline as shown in Figure 8 and adapted to nest within the concave section of the upper member $m$. One or more adjustable pins $m^2$ are threaded through the upper member $m$ and present on the inner concave surface thereof relatively smooth ends $m^3$ which are received, respectively, in arcuate recesses $n'$ on the convex surface of the lower member $n$. In the embodiment shown two such pins $m^2$ are employed at diametrically opposed points and the grooves $n'$ are also diametrically opposed but preferably formed circumferentially on the same radius. The preferred form of the recesses $n'$ is shown in Figure 9. When the lever $l$ is swung it will be clear that the member $m$ will be given a rotational movement with respect to the member $n$ whereby the pins $m^3$ will be constrained to move in their respective recesses $n'$. Since the bottoms of these grooves are curved such rotational movement will set up a sort of camming action of the pins in the grooves whereby return to normal of the parts will be greatly facilitated. Here again, as described above, the turning of one of the members with respect to the other causes the force of the spring $g$ to be transmitted between the members through a radius represented by the distance of the point of contact of the pins $m^3$ with the surface $n'$. It will be readily seen that this radius is less than the effective radius through which the force of spring $g$ is normally transmitted between the cooperating surfaces of the members $m$ and $n$. This is because the mean effective area and pressure between the nested curved surfaces lies a greater distance from the axis of the joint than the points of contact of the pins $m^3$.

It will be seen that the radii of curvature of the outer contacting portions of the concave member $f$ and convex member $h$ are the same and are greater than the greatest distance from the axis of the members to any point on the contacting surfaces thereof, and that these normal surfaces are therefore not spherical. When in normal position, therefore, the members resist universal action. The surfaces of the members between these normal contacting surfaces, being spaced apart, enable the cooperating members to accommodate universal action and it is between these spaced apart surfaces that the camming action takes place to throw the point of application of the spring pressure nearer the axis of the members.

While this connection is adapted for constructions wherein movement takes place about a truly vertical pivot, it will be seen that, in as much as the recesses are formed with camming surfaces in every direction, a degree of universal movement may take place to accommodate conditions resulting from camber and castor action of the wheels.

From the aforegoing description it is to be understood that the principle of the invention may be practiced by means which differ in form and relationship from the precise means illustrated herein and that the results obtained may be useful in other linkage connections than the steering mechanism of automobiles. For instance, it will be apparent to one skilled in the art that in the form of device shown in Figures 3 and 4 pins such as are illustrated in Figure 7 might be used for co-operation with curved surfaces of the complementary member and a similar action secured. Contrariwise co-operating cam surfaces of some other form than that afforded by pins might be incorporated in the type illustrated in Figure 7. Such details of design are within the skill of the practical man and will vary to meet particular conditions.

What I claim is:

1. In a road vehicle having a pair of steering wheels, steering arms carried by the respective wheels, means to mount the wheels and arms to turn in planes at an angle to the horizontal, a tie rod between the ends of the steering arms, and friction connections between the ends of the arms and the ends of the tie rods, said connections comprising nested concavo-convex elements having different radii of curvature whereby pivotal movement of the wheels and arms causes an angular movement between the planes of the tie rod and the steering arms to vary the angle of contact between the nested friction elements.

2. In a road vehicle having a pair of steering wheels, reversely inclined pivot pins on which the respective wheels are mounted to turn, steering arms carried by the respective wheels, and a tie rod and connections between the ends thereof and the steering arms, the plane of the tie rod being at an angle to planes perpendicular to the axes of the connections between the steering arms and tie rod when the wheels are turned, said connections including friction joints between the arms and the ends of the tie rod and comprising nested friction elements which are adapted to move in planes at an angle to each other and are concavo-convex in a plane in which lies the axes of the elements, the radius of curvature of one of the elements being greater than the other, whereby pivotal movement of the elements causes their partial separation and the angle of contact between such elements with respect to the axis thereof to vary.

3. An operating member, a member operated thereby, and a friction joint therebetween including concentric cooperating relatively movable members having opposed surfaces spaced from the axis of the joint to transmit forces between the members, means positioned nearer the axis of the joint than the first surfaces to transmit forces between the members upon a predetermined relative movement between the members, and means to urge the members toward each other.

4. An operating member, a member operated thereby, and a friction joint therebetween including concentric cooperating relatively movable members having opposed spaced surfaces from the axis of the joint to space the members apart normally, means positioned nearer the axis than the last named means to space the said last named means apart upon a predetermined relative movement between the members, and means to urge the members toward each other.

5. An operating member, a member operated thereby, and a friction joint therebetween including nested members having concavo-convex surfaces, means to urge the members toward each other, said surfaces having means formed thereon to vary the effective distance of the contact between the surfaces from the center thereof upon a predetermined relative movement between the nested members.

6. An operating member, a member operated thereby, and a friction joint therebetween including nested members having concavo-convex surfaces, means to urge the members toward each other, said members being formed and connected to accommodate relative movement between the axes thereof, said surfaces having means formed thereon to vary the effective distance of the contact between the surfaces from the centers thereof upon movement of one of the axes with respect to the other.

7. An operating member, a member operated thereby, and a friction joint therebetween including nested members having concavo-convex surfaces, means to urge the members toward each other, said members being formed and connected to accommodate said surfaces, having means formed thereon to contact and transmit normal forces therebetween at a distance normally spaced from the centers thereof, said surfaces further being formed to contact and space the members at a distance nearer the axes thereof than the normal spacing when the surfaces are turned and the axes shifted from normal positions.

8. An operating member and a member operated thereby, and a friction joint therebetween comprising cooperating members, one of said members having a convex surface and the other of said members having a concave surface nested with respect to the convex surface, the radii of curvature of said surfaces being greater than the greatest distance from the axis of the members to any point on the contacting surfaces thereof, said convex and concave surfaces forming normal contacting surfaces, the members having portions contiguous to the first surfaces and nearer the axes of the members which are spaced apart when the members are in a normal position and contact upon a predetermined movement of one of the members with respect to the other.

9. An operating member and a member operated thereby, and a friction joint therebetween comprising cooperating members, one of said members having a convex surface and the other of said members having a concave surface nested upon the convex surface, the radius of curvature of the convex and concave surfaces being greater than the diametrical distance between spaced contacting points of said surfaces upon opposite sides of either of the members, said convex and concave surfaces being adapted to be spaced apart by spaced surfaces on said members nearer the axes thereof and having different radii of curvature, each of which is smaller than that of the first surfaces.

10. An operating member, a member operated thereby, and a friction joint therebetween including concentric cooperating relatively movable members having opposed contacting curved surfaces, said members being formed to permit a degree of universal motion to take place therebetween, the members further being formed to set up an impositive frictional resistance in a normal position, which resistance is decreased upon a predetermined relative movement between the members.

WILLIAM CATHCART.